(12) United States Patent
Taylor et al.

(10) Patent No.: US 10,800,346 B2
(45) Date of Patent: Oct. 13, 2020

(54) RELEASABLY ATTACHABLE ROOF PANEL

(71) Applicant: Ford Global Technologies, LLC, Dearborn, MI (US)

(72) Inventors: Mark Taylor, Ypsilanti, MI (US); Robert McPhail, South Lyon, MI (US); Martyn Swain, Ann Arbor, MI (US); Geoff John Cooper, Canton, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 57 days.

(21) Appl. No.: 16/146,271

(22) Filed: Sep. 28, 2018

(65) Prior Publication Data

US 2020/0101905 A1   Apr. 2, 2020

(51) Int. Cl.
| *B60R 11/04* | (2006.01) |
| *B60R 11/02* | (2006.01) |
| *B62D 25/06* | (2006.01) |
| *B60J 10/90* | (2016.01) |
| *B60R 11/00* | (2006.01) |
| *B60J 1/02* | (2006.01) |

(52) U.S. Cl.
CPC .............. *B60R 11/04* (2013.01); *B60J 10/90* (2016.02); *B60R 11/0258* (2013.01); *B62D 25/06* (2013.01); *B60J 1/02* (2013.01); *B60R 2011/004* (2013.01)

(58) Field of Classification Search
CPC ...... B60R 11/04; B60R 11/0258; B60J 10/90; B62D 25/06
USPC ......................................................... 296/210
See application file for complete search history.

(56) References Cited

U.S. PATENT DOCUMENTS

| 6,118,410 | A | 9/2000 | Nagy |
| 6,965,347 | B2 | 11/2005 | Sugimoto et al. |
| 7,847,744 | B2 | 12/2010 | Mierzwa et al. |
| 9,963,018 | B2 | 5/2018 | Williams et al. |
| 10,071,773 | B2 * | 9/2018 | Williams ................ B60R 11/04 |
| 10,302,744 | B1 * | 5/2019 | Krishnan .............. G01S 17/931 |
| 2007/0216768 | A1 | 9/2007 | Smith et al. |
| 2008/0111750 | A1 | 5/2008 | Yoshie |
| 2017/0261273 | A1 * | 9/2017 | Maranville ........... G01S 7/4813 |

FOREIGN PATENT DOCUMENTS

JP           2012232679 A     11/2012

* cited by examiner

*Primary Examiner* — Joseph D. Pape
(74) *Attorney, Agent, or Firm* — David Coppiellie; Bejin Bieneman PLC (57) ABSTRACT

A vehicle assembly includes a vehicle body including two roof rails spaced from one another. The vehicle assembly further includes a roof panel which is releasably attached to the vehicle body. The roof panel extends from one roof rail to the other roof rail. The roof panel defines a sensor window. An object-detection sensor is aligned with the sensor window.

20 Claims, 8 Drawing Sheets

RELEASABLY ATTACHABLE ROOF PANEL

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by temperature, e.g., a sensor that is too hot may not operate properly.

DETAILED DESCRIPTION

A vehicle assembly comprises a vehicle body including two roof rails spaced from one another. A roof panel releasably attached to the vehicle body and extending from one roof rail to the other roof rail. The roof panel defines a sensor window and an object-detection sensor is aligned with the sensor window.

The roof panel may be unitary.

The roof panel may be releasably attached to the roof rails.

The vehicle assembly may include a releasable connection between the roof panel and the vehicle body.

The vehicle body may include a bin including a compartment with the object-detection sensor disposed in the compartment.

The bin may extend from one roof rail to the other roof rail.

The vehicle assembly may include two beams spaced from each other and with each extending from one roof rail to the other roof rail. The bin may extend from one of the beams to the other of the beams.

The bin may extend from one roof rail to the other roof rail.

A seal may be positioned between the roof panel and the roof rails and may be between the roof panel and the beams.

The vehicle body may include a fixed roof panel. The bin and the fixed roof panel may both be irremovably fixed to one of the beams.

A fan may be disposed in the compartment and in fluid communication with the object-detection sensor.

The roof panel may define an air intake in fluid communication with the fan.

A nozzle may be adjacent the sensor window and a fluid delivery device. The fluid delivery device may be disposed in the compartment and may be in fluid communication with the nozzle.

The fluid delivery device may be a fan.

The fluid delivery device may be a liquid pump.

A releasable connection may be between the roof panel and the body. The bin may include an access port and the releasable connection may be accessible through the access port.

The roof panel may be a polymer material.

A seal may be between the roof panel and the vehicle body.

A fixed roof panel may be irremovably fixed to the vehicle body and may be disposed adjacent the roof panel.

A windshield may be fixed to the vehicle body and may be disposed adjacent the roof panel.

With reference to the Figures, wherein like numerals indicate like parts throughout the several views, a vehicle assembly 10 of a vehicle 12 includes a vehicle body 14 including two roof rails 16 spaced from one another. The vehicle assembly 10 includes a roof panel 18 releasably attached to the vehicle body 14 and extending from one roof rail 16 to the other roof rail 16. The roof panel 18 defines a sensor window 20. The vehicle assembly 10 includes an object-detection sensor 22 aligned with the sensor window 20.

The roof panel 18 being releasably attached to the vehicle body 14 allows for a user to remove the roof panel 18 from the vehicle body 14, for example, to repair and/or replace the roof panel 18 and/or components under the roof panel 18, e.g., electronics, the object-detection sensor 22, etc. Since the roof panel 18 extends from one roof rail 16 to the other roof rail 16, the roof panel 18 is easily assembled and disassembled from the vehicle 12. As set forth below, the roof panel 18 is sealed to the roof rails 16 and, since the roof panel 18 extends from one roof rail 16 to the other roof rail 16, the roof panel 18 is incorporated into water management features of the vehicle body 14. When assembled to the vehicle body 14, the extension of the roof panel 18 from one roof rail 16 to the other roof rail 16 allows the roof panel 18 to easily match the contours of the vehicle body 14.

The vehicle 12 may be an autonomous vehicle and/or a semi-autonomous vehicle. The vehicle 12 may include a computer configured to operate the vehicle 12 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder.

Figure 1:
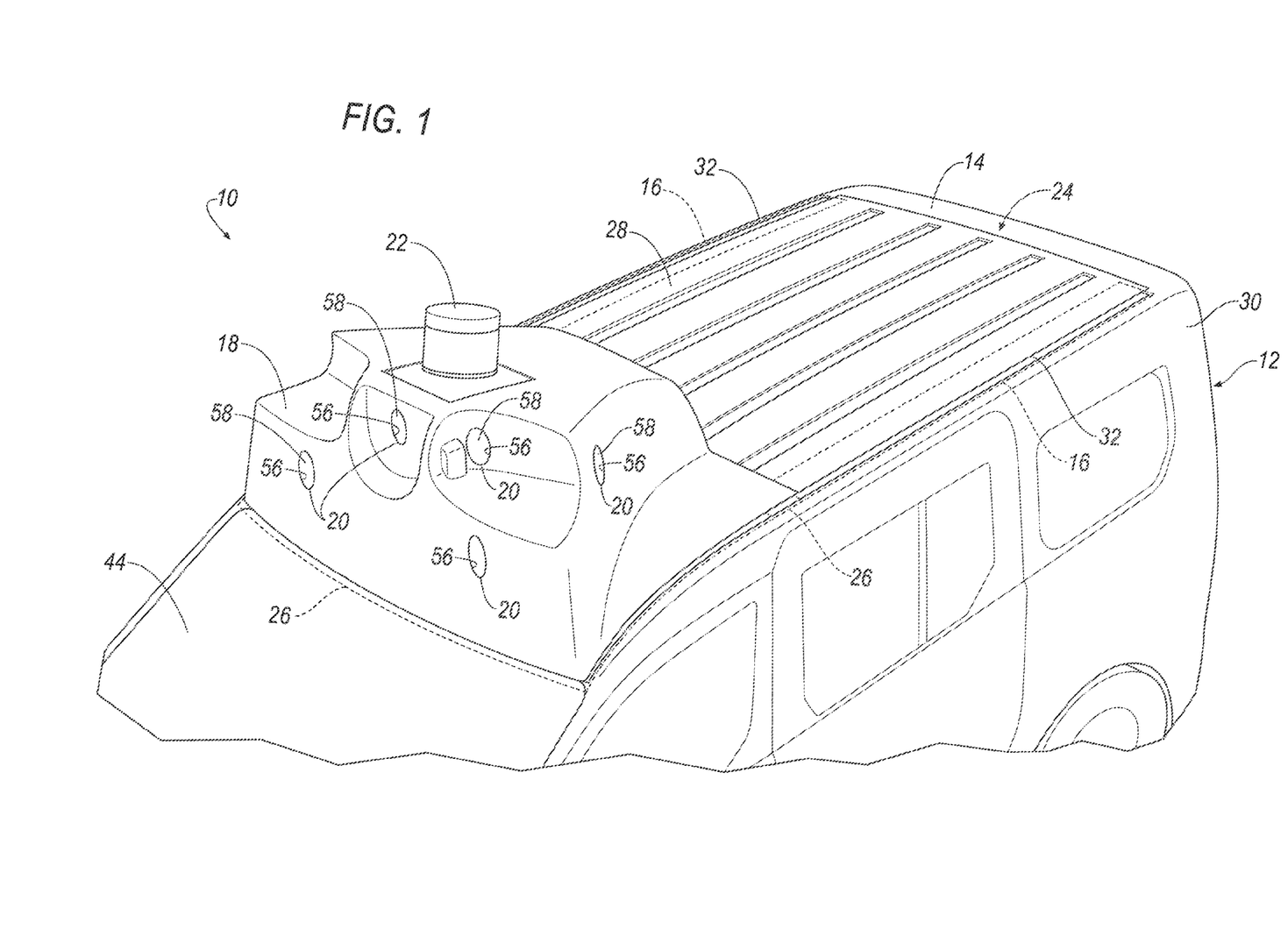
FIG. 1 is a perspective view of a vehicle assembly including a roof panel.

With reference to FIG. 1, the vehicle assembly 10 includes a vehicle body 14 and a roof panel assembly 24, which includes the roof panel 18 discussed further below. The vehicle body 14 may be of a unibody construction. In the unibody construction, the body, e.g., rockers, serves as a vehicle frame, and the vehicle body 14 (including the rockers, pillars, roof rails 16, etc.) is a unit. As another example, the vehicle body 14 and vehicle frame may have a body-on-frame construction (also referred to as a cab-on-frame construction). In other words, the vehicle body 14 and the vehicle frame are separate components, i.e., are modular, and the vehicle body 14 is supported on and affixed to the vehicle frame. Alternatively, the vehicle body 14 and the vehicle frame may have any suitable construction. The vehicle body 14 and/or the vehicle frame may of any suitable material, for example, steel, aluminum, etc.

Figure 2:
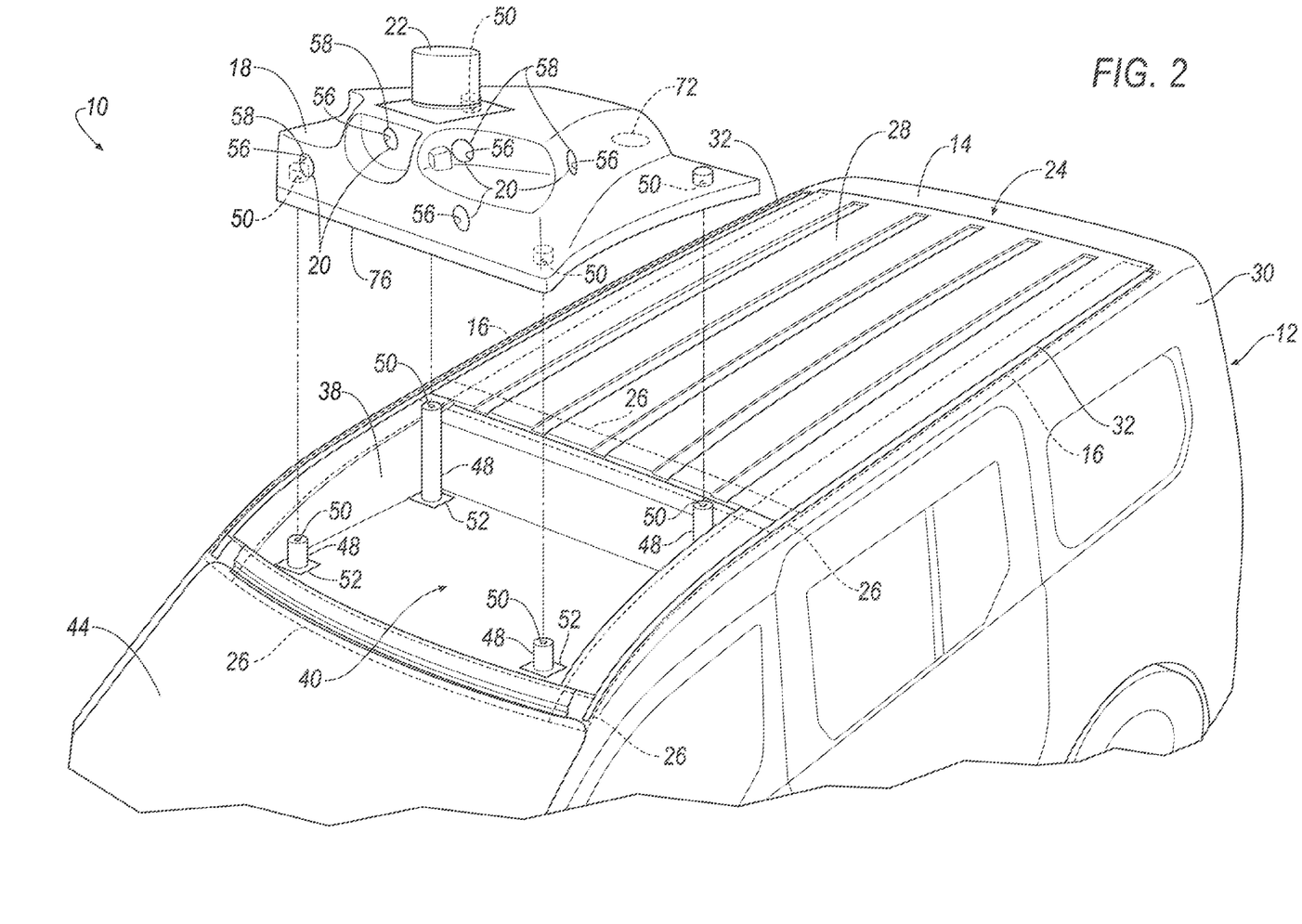
FIG. 2 is a perspective view of the vehicle with the roof panel exploded from the rest of the vehicle.

With reference to FIGS. 1 and 2, the vehicle body 14 includes two roof rails 16, as set forth above. The roof rails 16 are spaced from one another in a cross-vehicle direction. The roof rails 16 each extend longitudinally along the vehicle body 14, i.e., along a longitudinal axis of the vehicle body 14.

The vehicle body 14 includes two beams 26. The beams 26 are spaced from one another in a vehicle 12 fore-and-aft direction. The beams 26 extend from one roof rail 16 to the other roof rail 16. Both beams 26 may be irremovably fixed to both roof rails 16. In other words, the beams 26 are secured to the roof fails in such a way that removal requires destruction such as cutting, e.g., cutting material and/or welded joints, etc. As an example, the beams 26 may be attached to both roof rails 16, e.g., by welding, fasteners, etc. In addition to the two beams 26, the vehicle body 14 may include any suitable beams 26 space from one another and extending from one roof rail 16 to the other roof rail 16.

The body includes a fixed roof panel 28. The fixed roof panel 28 may extend from one roof rail 16 to the other roof rail 16. The fixed roof panel 28 may be irremovably fixed to the roof rails 16. In other words, the fixed roof panel 28 is secured to the roof fails in such a way that removal requires destruction such as cutting, e.g., cutting material and/or welded joints, etc. As an example, the fixed roof panel 28 may be attached to both roof rails 16, e.g., by welding, fasteners, etc. The fixed roof panel 28 may be irremovably fixed one of the beams 26, i.e., the rearward one of the two beams 26.

Two body side panels 30 are attached to the roof rails 16 and extend downward from the roof rails 16. The body side panels may include a door 78. A gutter 32 may extend between the roof panel 18 and the body side panel 30 for draining water. An applique may be disposed in the gutter 32. The applique may extend along the roof rail 16 in the gutter 32. The applique may be formed of a polymer material, e.g., a rubber.

An applique may be disposed between the roof panel 18 and the fixed roof panel 28, i.e., between a rear edge of the roof panel 18 and a front edge of the fixed roof panel 28. The applique may be formed of a polymer material, e.g., a rubber.

With reference to FIGS. 2-5, the vehicle body 14 may include a bin 38. The bin 38 is irremovably fixed to the rest of the vehicle body 14, e.g., by welding. For example, the bin 38 may be irremovably fixed to the roof rails 16 and/or the roof beams 26.

The bin 38 may extend from one roof rail 16 to the other roof rail 16 and/or may extend from one beam 26 to the other beam 26. In the example shown in the figures, the bin 38 extends from one roof rail 16 to the other roof rail 16 and from one beam 26 to the other beam 26. The bin 38 may be irremovably fixed to each roof rail 16 and/or each beam 26, e.g., by welding, adhesive, etc. In an example embodiment, the bin 38 may be of a generally rectangular shape. Alternatively, the bin 38 could be of any general shape such as to fit the vehicle body 14 and vehicle frame.

The bin 38 defines a compartment 40. The compartment 40 extends downwardly from the roof panel 18. Specifically, the compartment 40 is vertically lower than the roof panel 18, the fixed roof panel 28, the roof rails 16, and the beams 26. The compartment 40 may extend into the passenger compartment 40 above a headliner 42 (discussed below). The compartment 40 is open upwardly to the roof panel assembly 24. The roof panel 18 is positioned over the compartment 40 to cover the compartment 40. Components of the roof panel assembly 24, e.g., the object-detection sensor 22, may be disposed in the compartment 40.

The vehicle 12 includes a windshield 44 disposed adjacent to the roof panel 18. The windshield 44 may extend generally downward from the roof panel 18. The windshield 44 is fixedly to the vehicle body 14, e.g., with adhesive and/or epoxy. An applique may run along an edge of the windshield 44 between the windshield 44 and the roof panel 18. The applique may be formed of a polymer material, e.g., a rubber.

A headliner 42 (shown in FIG. 5) may be supported by the vehicle body 14 underneath the roof panel 18 and/or the fixed roof panel 28. The headliner 42 may conceal the roof panel 18 and/or the fixed roof panel 28 from view inside the vehicle 12, i.e., in a passenger compartment 40 of the vehicle 12. The headliner 42 includes a class-A surface facing the passenger compartment, i.e., a surface specifically manufactured to have a high quality, finished, aesthetic appearance free of blemishes.

As stated above, the roof panel assembly 24 includes the roof panel 18. The roof panel 18 may be a polymer material. As an example, the roof panel 18 may be polycarbonate, sheet molding compound (SMC), fiber-reinforced plastic, etc. As another example, the roof panel 18 may be metal or any other suitable material.

The roof panel 18 may be unitary. In other words, the roof panel 18 is of a single piece of material with no seams, joints, fasteners, or adhesives. As an example, the roof panel 18 may be formed by injection molding, stamping, etc. In such examples, the roof panel 18 may be formed in a mold as a unitary construction. In the alternative to being unitary, the roof panel 18 may include components that are separately formed and subsequently attached together, e.g., by welding, bonding, etc.

The roof panel 18 may include a class-A surface facing outwardly i.e., a surface specifically manufactured to have a high quality, finished, aesthetic appearance free of blemishes. The roof panel 18 may be of a color that matches other components of the body, e.g., the fixed roof panel 28, the body panels, etc.

As set forth above, the roof panel 18 is releasably attached to the vehicle body 14. As one example, with reference to FIG. 2, at least one releasable attachment 48 is between the roof panel 18 and the vehicle body 14, e.g., the bin 38. The releasable attachment 48 selectively releases the roof panel 18 from the vehicle body 14 in a non-destructive manner to both the roof panel 18 and the vehicle body 14. As one example, the releasable attachment 48 may be a bolt that engages holes 50 in the roof panel 18 and the vehicle body 14, e.g., the bin 38. Any suitable number of releasable attachments 48 may attach the roof panel 18 and the vehicle body 14. For example, four releasable attachments 48 are shown in FIG. 2.

The releasable attachment 48 may be accessible only from an interior of the vehicle 12. The roof panel 18 may conceal access to the releasable attachment 48 when assembled to the vehicle body 14. For example, the releasable attachment 48 may be accessible through the headliner 42 or may be accessible after removal of the headliner 42.

With reference to FIGS. 2-5, the bin 38 may include an access port 52 located at a bottom of the bin 38 to access the releasable attachments 48 of the roof panel assembly 24. For example, the access port 52 shown in FIG. 2 has a tubular void facing into the passenger compartment 40. The bin 38 may include more than one access port 52. This allows for removal of the roof panel assembly 24 from the vehicle body 14. The removal of the roof panel assembly 24 allows for access to any items inside the compartment 40 for service. Additionally, the removal of the roof panel assembly 24 allows for replacement of the roof panel assembly 24 for service. The roof panel assembly 24 may also be interchangeable among several different vehicles because roof panel assembly 24 is releasable from the vehicle body 14.

Figure 6:
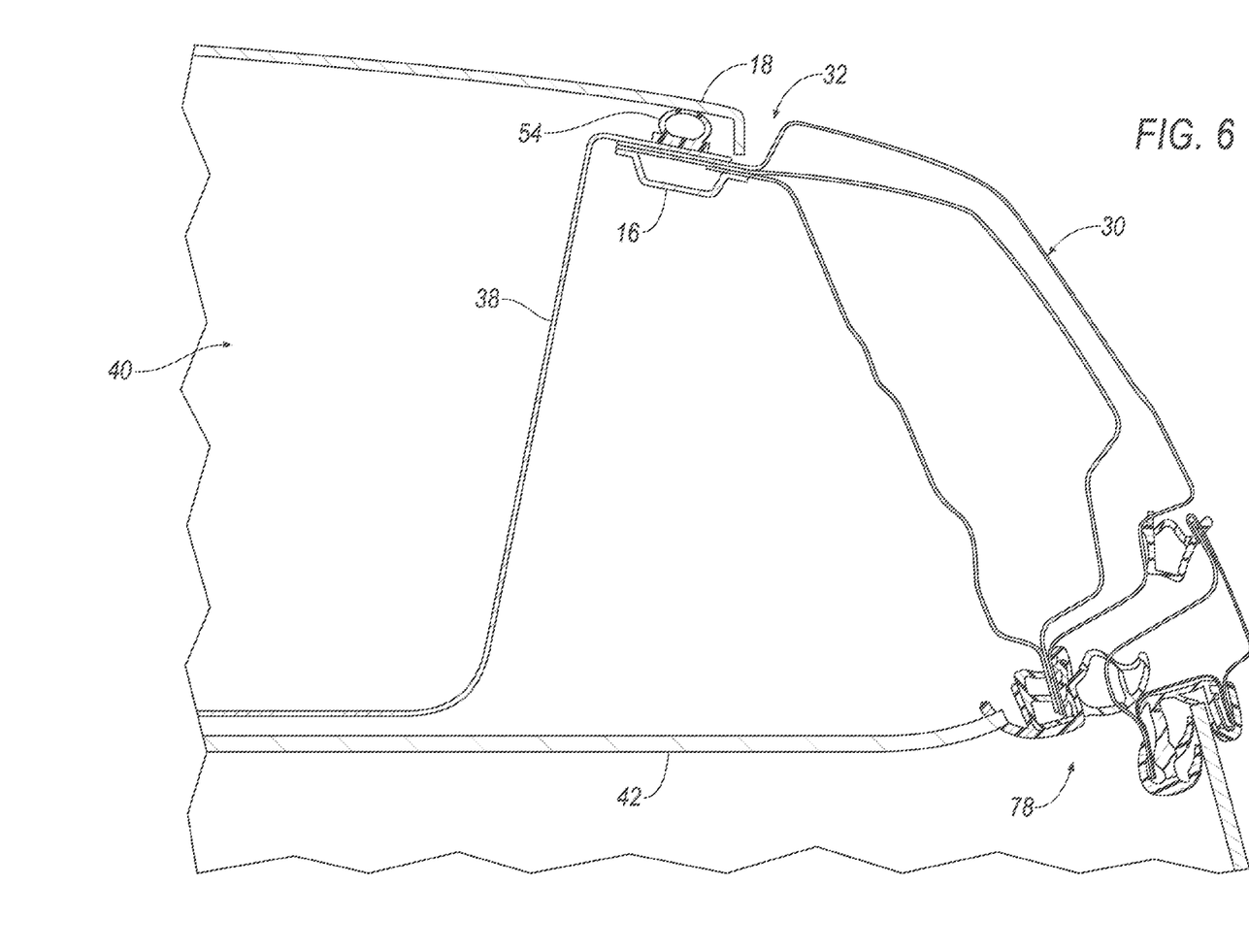
FIG. 6 is a cross-sectional view through line 6 in FIG. 3.
Figure 7A:
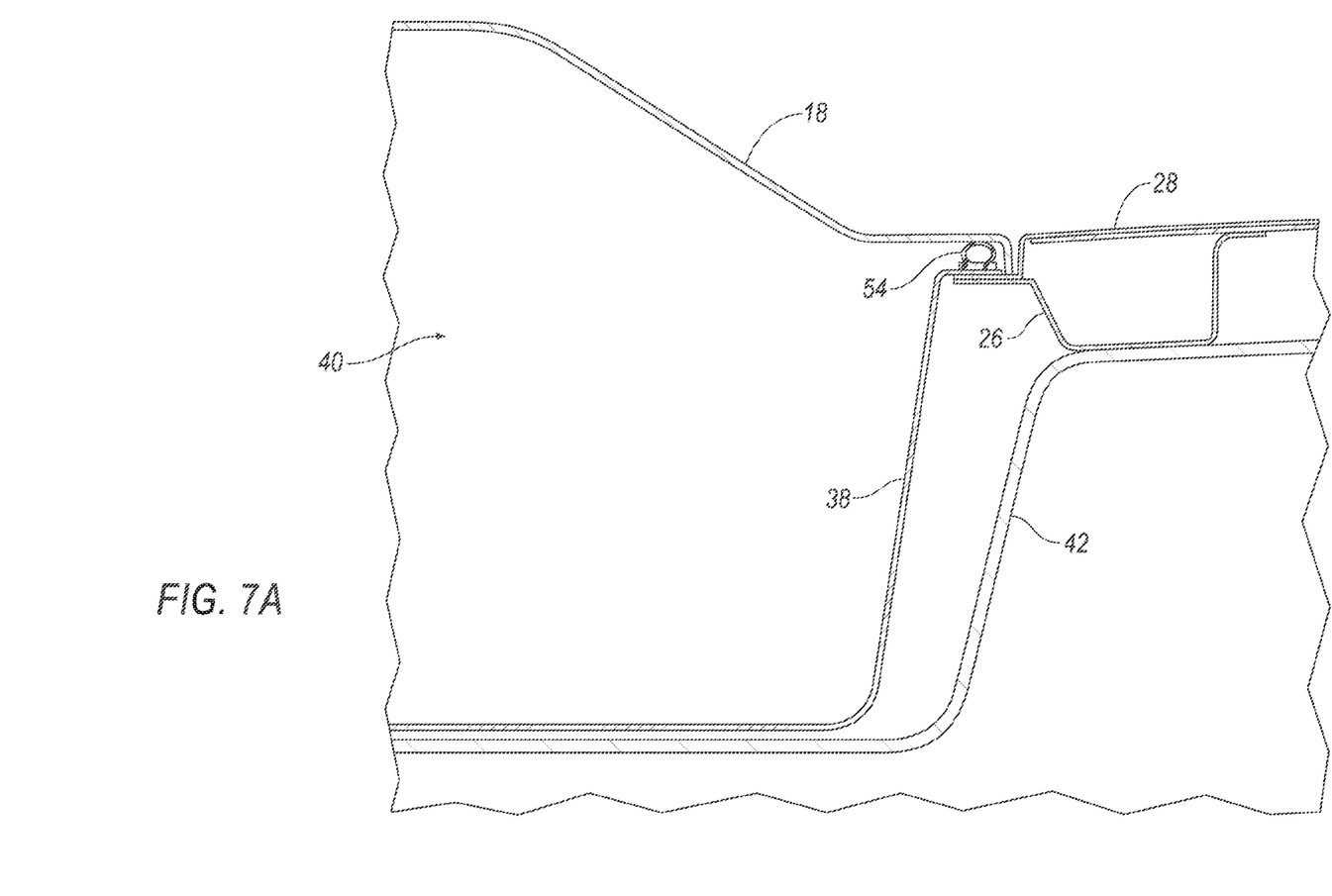
FIG. 7A is a cross-sectional view through line 7A in FIG. 3.
Figure 7B:
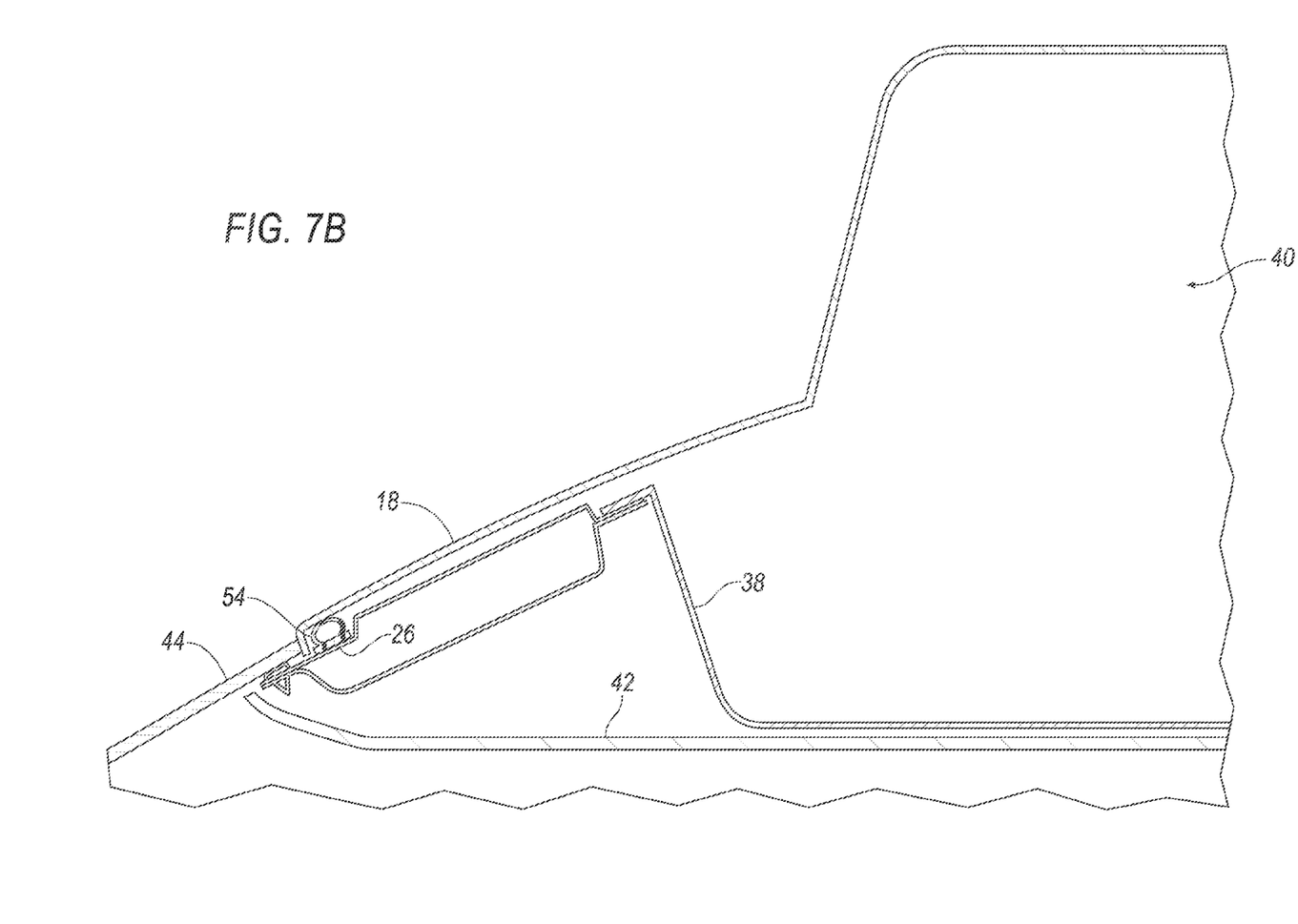
FIG. 7B is a cross-sectional view through line 7B in FIG. 3.

With reference to FIGS. 6-7B, a seal 54 may be positioned between the roof panel 18 and the vehicle body 14 for preventing intrusion of water. In an example embodiment, the seal 54 may be positioned between the roof panel 18 and the beams 26 and/or between the roof panel 18 and the roof rails 16. In the example shown in the Figures, the seal 54 may extend along an edge of the roof panel 18 and may be positioned between the roof panel 18 and the beams 26 and between the roof panel 18 and the roof rails 16.

The seal 54 is a material that may be reusable such as a reusable adhesive, rubber, foam, etc. In other words, when the roof panel 18 is released and reattached to the vehicle body 14, a new seal 54 does not need to be added to the roof panel 18 for the seal 54 to continue to function correctly. As another example, the seal 54 may be destroyed when the roof panel 18 is removed, in which case the seal 54 is replaced before reattachment of the roof panel 18 to the vehicle body 14.

With reference to FIGS. 1-5, the roof panel assembly 24 includes a sensor window 20. The sensor window 20 has a field of view. The roof panel assembly 24 may include more than one sensor window 20, as shown in the Figures Each of the sensor windows 20 is transparent. Each of the sensor windows 20 may include an aperture 56, defined by the roof panel 18. Each of the sensor windows 20 may include a lens 58 fixed to the roof panel 18 in the aperture 56. The lens 58 may be of any suitable material, e.g., glass, plastic.

Figure 3:
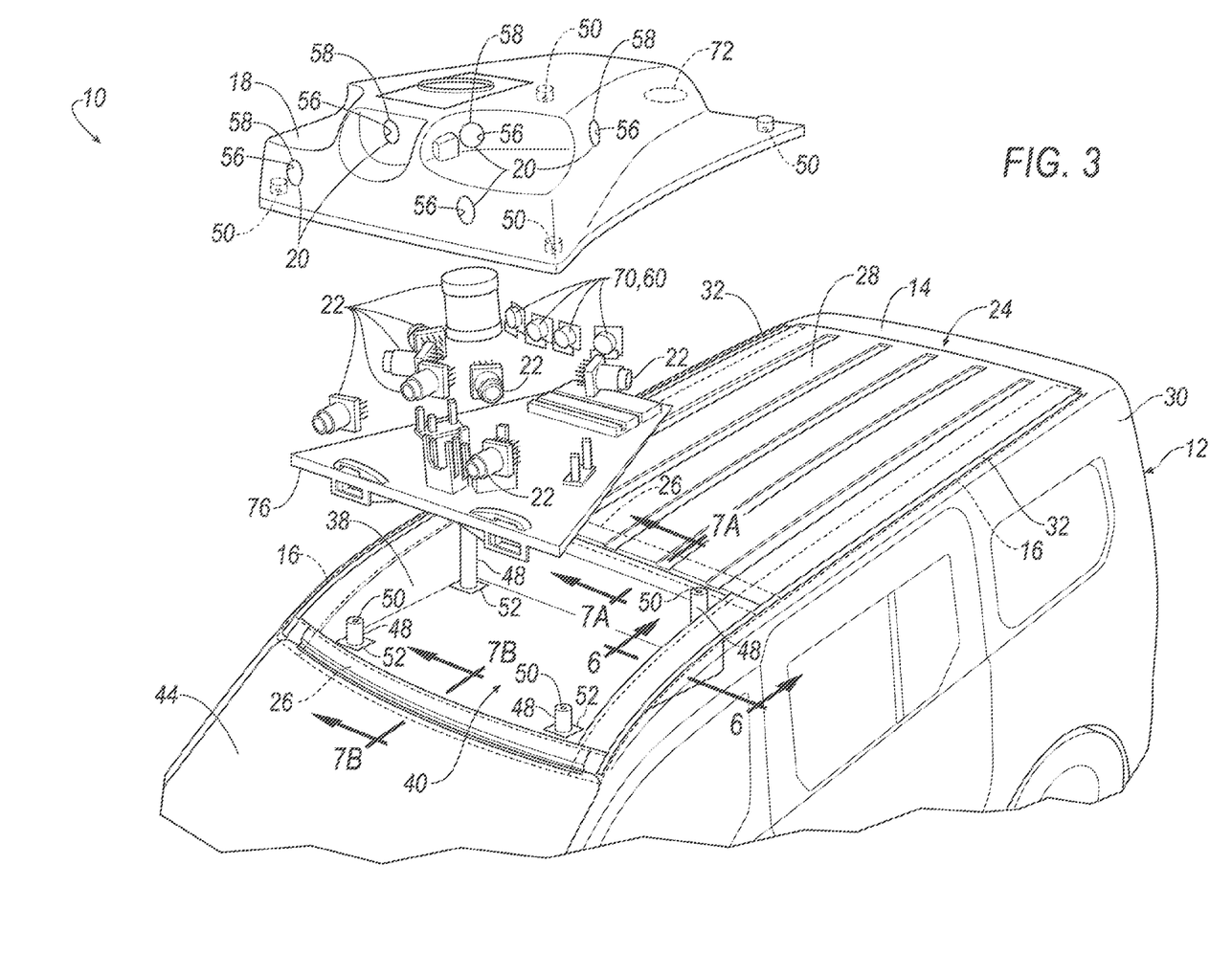
FIG. 3 is a perspective view of the vehicle assembly with the roof panel exploded from the rest of the vehicle and from a plurality of object-detection sensors.
Figure 4:
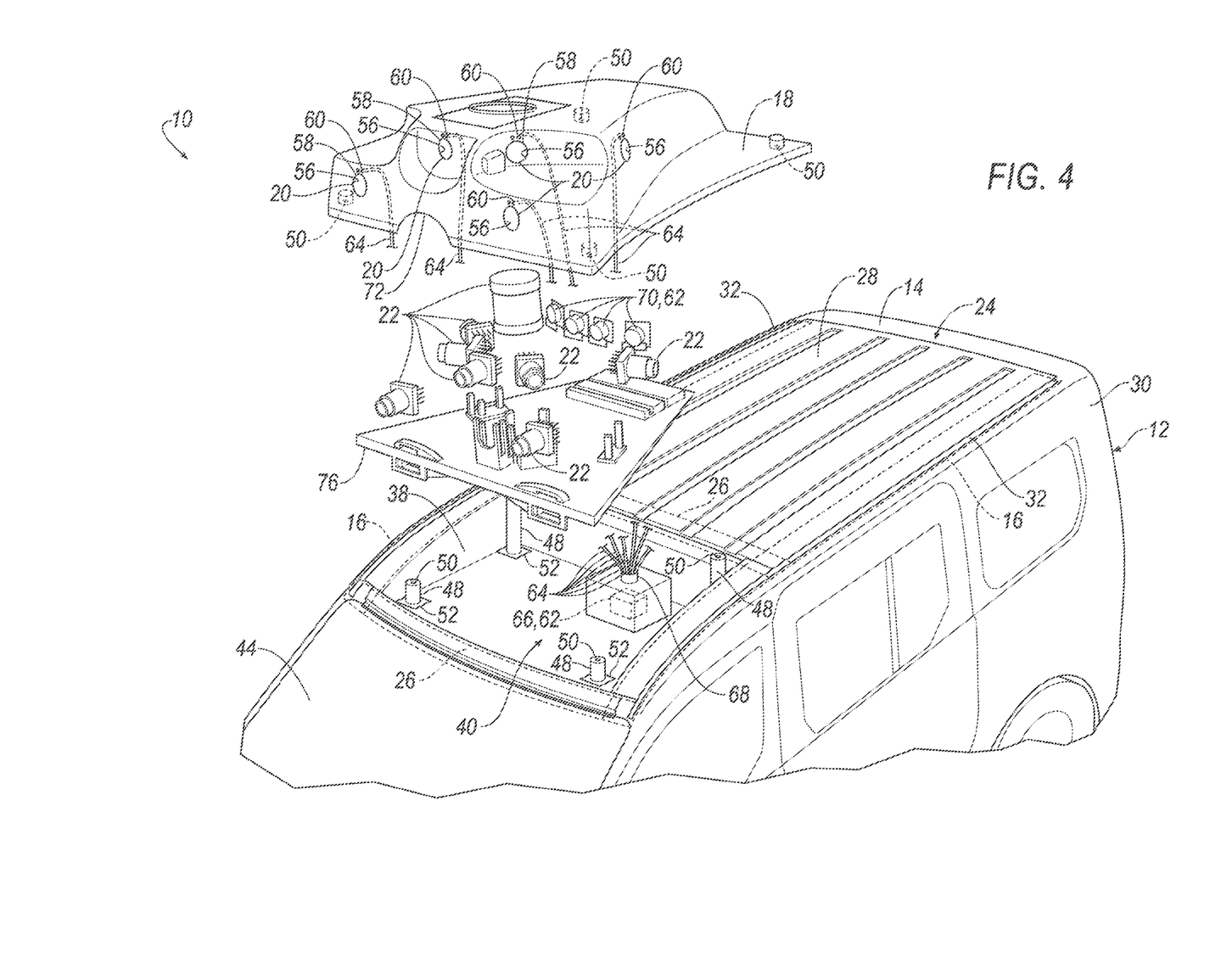
FIG. 4 is a perspective view of the vehicle assembly with the roof panel exploded from the vehicle and from a plurality of object-detection sensors to show a fluid delivery device.
Figure 5:
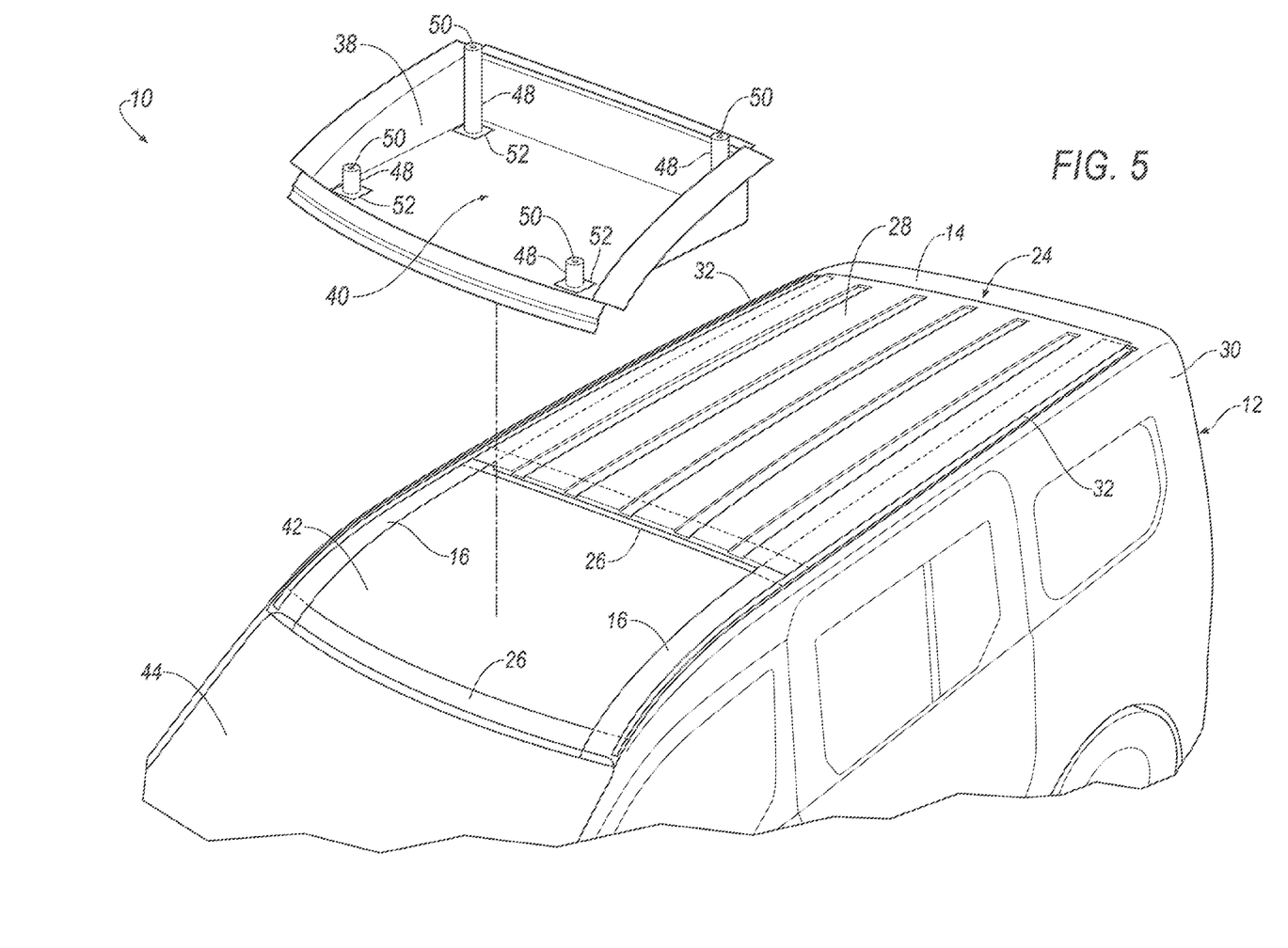
FIG. 5 is a perspective view of the vehicle assembly with a bin exploded from the rest of the vehicle.

With reference to FIGS. 3 and 4, the roof panel assembly 24 includes an object-detection sensor 22 which may be disposed in the compartment 40. The roof panel assembly 24 may include more than one object-detection sensor 22. The sensor windows 20 are adjacent the object-detection sensor 22, respectively. The object-detection sensors 22 are oriented such that each of the object-detection sensors 22 faces the respective sensor window 20. Specifically, the field of view of each of the sensor windows 20 permits light to pass therethrough, and each of the object-detection sensors 22 is positioned to sense the light passing through the field of view of each of the sensor windows 20, respectively. The size of each of the sensor windows 20 may complement the field of view of each of the object-detection sensors 22 adjacent the related sensor window 20.

The object-detection sensors 22 may detect the external world. For example, the object-detection sensors 22 may be radar sensors, scanning laser range finders, light detection and ranging (LIDAR) devices, image processing sensors such as cameras, or any other sensors that detect light. The object-detection sensors 22 may generate data representing an image captured by the object-detection sensors 22. Each of the object-detection sensors 22 can detect phenomena such as light, and sound, beginning at and outward from each related sensor window 20.

The roof panel 18 may include a nozzle 60 adjacent the sensor windows 20 and facing the sensor window 20 for cleaning the sensor window 20. For example, the nozzle 60 may provide an air curtain to reduce or prevent contaminants, e.g., dirt, water, snow, etc., from reaching the sensor window 20 and/or may provide gas and/or liquid to remove contaminants from the sensor window 20. The roof panel 18 may include more than one nozzle 60, e.g., one for each sensor window 20. As described further below, the nozzle 60 may deliver fluid, i.e., liquid and/or gas, to the sensor window 20 to clean the sensor window 20. The roof panel 18 may include more than one nozzle 60 for each sensor window 20. In the example shown in the Figures, the roof panel 18 includes one nozzle 60 for delivery of liquid to the sensor window 20 and another nozzle 60 for delivery of air to the sensor window 20. As another example, a single nozzle 60 for each sensor window 20 may deliver liquid and/or gas to the sensor window 20.

The roof panel assembly 24 may include a plate 76 fixed to the bin 38 in the compartment 40. The object-detection sensors 24 may be supported on the plate 76. The plate 76 may be fixed to the bin 38 in any suitable fashion. As one example, the plate 76 may be releasably attached to the bin 38, e.g., with clips, fasteners, etc., so that the plate 76 and sensors 24 may be removed for repair, replacement, etc.

A fluid delivery device 62 may be disposed in the compartment 40. The fluid delivery device 62 is in fluid communication with the nozzles 60 with a hose 64. The fluid deliver device may deliver liquid and/or gas to the nozzle 60 through the hose 64. The vehicle 12 may include any suitable number of fluid delivery devices 62. The vehicle 12 may include any suitable number of hoses 64. In the example shown in the Figures and as described further below, the vehicle 12 includes a fluid delivery device 62 for delivering liquid to one nozzle 60 and another fluid delivery device 62 for delivering air to another nozzle 60.

The fluid delivery device 62 may be, for example, a liquid pump 66. In such an example, the liquid pump 66 delivers liquid to the nozzle 60, e.g., by tubes. The liquid pump 66 may be in a liquid reservoir 68 in the compartment 40, as shown in FIG. 4, for example. As another example, the liquid reservoir 68 may be external to the compartment 40, e.g., in an engine compartment 40, and the liquid pump 66 may be in the compartment 40 and in communication with the liquid reservoir 68. In such an example, the liquid reservoir 68 in the compartment 40 may be shared by a windshield 44 cleaning system. The liquid may be, for example, a solvent such as a windshield 44 cleaning solvent.

As another example, the fluid delivery device 62 may be a fan 70 for blowing gas, e.g., air, out of the nozzle 60 to the sensor window 20. The fan 70 may be disposed in the compartment 40 and in fluid communication with the object-detection sensor 22. In the example shown in the Figures, the fan 70 pressurizes the compartment 40 with external air. The pressurized air in the compartment 40 exits the roof panel 18 through the nozzles 60 to maintain the sensor windows 20 free of contaminants. Specifically, the pressurized air exiting the nozzles 60 flows across the sensor windows 20 to clean contaminants from the sensor windows 20, respectively, and/or to block contaminants from reaching the sensor windows 20, respectively. Since the fan 70 is in the compartment 40, the fan 70 supplies pressurized air to the nozzles 60 to maintain the sensor windows 20 free of contaminants. This eliminates the need for individualized pressure sources at each of the nozzles 60, which may reduce the cost and/or complexity of the roof panel assembly 24. In such an example where the fan 70 pressurizes air in the compartment 40, the compartment 40 may be hermetically sealed with the exception of an air intake 72 (described below) and the nozzles 60. For example, the seal 54 may seal the roof panel 18 to the bin 38 to reduce or eliminate airflow between the roof panel 18 and the bin 38.

The air movement in the compartment 40 caused by the fans 70 may cool the object-detection sensors 22. This may help the object-detection sensors 22 maintain an optimal temperature level. The air in the compartment 40 may consequently be heated from flowing across the object-detection sensors 22 before exiting the nozzles 60. Upon exiting the nozzle 60, the heated fluid may help maintain the sensor window 20 free of contaminants. Specifically, the heated fluid may melt snow and disperse water on the sensor window 20, and may also block snow, water and other contaminants from reaching the sensor window 20.

As set forth above, the roof panel 18 defines the air intake 72. The air intake 72 is in fluid communication with the fan 70. The air intake 72 may be located at a plurality of locations of the roof panel 18, so long as to remain in fluid communication with the fan 70 disposed in the compartment 40. As an example, the air intake 72 is shown at a rear of the roof panel 18 in FIGS. 2 and 3 and the air intake 72 is shown at a front of the roof panel 18 in FIG. 4.

The roof panel assembly 24 may be removed from the vehicle body 14. For example, the releasable attachments 48 may be disengaged from the roof panel 18 and/or the vehicle body 14, e.g., the bin 38. This allows the roof panel assembly 24 to be removed from the vehicle body 14. The removal of the roof panel assembly 24 allows for replacement and/or repair of components of the roof panel assembly 24. The removal of the roof panel assembly 24 allows for access to the object-detection sensors 22 or any other components under the roof panel 18, e.g., electronics, etc. The roof panel assembly 24 may also be interchangeable among several different vehicles because it is releasable from the vehicle body 14. This lowers costs of needed a roof panel assembly 24 for every vehicle 12 owned by a user.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle assembly comprising:
a vehicle body including two roof rails spaced from one another;
a roof panel releasably attached to the vehicle body and extending from one roof rail to the other roof rail;
the roof panel defining a sensor window;
an object-detection sensor aligned with the sensor window;
the vehicle body including a bin including a compartment, the object-detection sensor disposed in the compartment; and
two beams spaced from each other and each extending from one roof rail to the other roof rail, the bin extending from one of the beams to the other of the beams.

2. The vehicle assembly of claim 1, wherein the roof panel is unitary.

3. The vehicle assembly of claim 1, wherein the roof panel is releasably attached to the roof rails.

4. The vehicle assembly of claim 1, further comprising a releasable connection between the roof panel and the vehicle body.

5. The vehicle assembly of claim 1, wherein the bin extends from one roof rail to the other roof rail.

6. The vehicle assembly of claim 1, wherein the bin extends from one roof rail to the other roof rail.

7. The vehicle assembly of claim 6, further comprising a seal between the roof panel and the roof rails and between the roof panel and the beams.

8. The vehicle assembly of claim 1, further comprising a fixed roof panel, the bin and the fixed roof panel both being irremovably fixed to one of the beams.

9. The vehicle assembly of claim 1, further comprising a fan disposed in the compartment and in fluid communication with the object-detection sensor.

10. The vehicle assembly of claim 9, wherein the roof panel defines an air intake in fluid communication with the fan.

11. The vehicle assembly of claim 1, further comprising a nozzle adjacent the sensor window and a fluid delivery device, the fluid delivery device being disposed in the compartment and in fluid communication with the nozzle.

12. The vehicle assembly of claim 11, wherein the fluid delivery device is a fan.

13. The vehicle assembly of claim 11, wherein the fluid delivery device is a liquid pump.

14. The vehicle assembly of claim 1, further comprising a releasable connection between the roof panel and the vehicle body, the bin including an access port and the releasable connection being accessible through the access port.

15. The vehicle assembly of claim 1, wherein the roof panel is a polymer material.

16. The vehicle assembly of claim 1, further comprising a seal between the roof panel and the vehicle body.

17. The vehicle assembly of claim 1, further comprising a fixed roof panel irremovably fixed to the vehicle body and disposed adjacent the roof panel.

18. The vehicle assembly of claim 1, further comprising a windshield fixed to the vehicle body and disposed adjacent the roof panel.

19. A vehicle assembly comprising:
a vehicle body including two roof rails spaced from one another; a bin including a compartment;
a roof panel releasably attached to the vehicle body and extending from one roof rail to the other roof rail;
the roof panel defining a sensor window;
an object-detection sensor aligned with the sensor window;
the vehicle body including a bin including a compartment, the object-detection sensor disposed in the compartment; and
a nozzle adjacent the sensor window and a fluid delivery device, the fluid delivery device being disposed in the compartment and in fluid communication with the nozzle.

20. A vehicle assembly comprising:
a vehicle body including two roof rails spaced from one another; a bin including a compartment;
a roof panel releasably attached to the vehicle body and extending from one roof rail to the other roof rail;
the roof panel defining a sensor window;

an object-detection sensor aligned with the sensor window;

the vehicle body including a bin including a compartment, the object-detection sensor disposed in the compartment; and a releasable connection between the roof panel and the vehicle body, the bin including an access port and the releasable connection being accessible through the access port.

\* \* \* \* \*